(12) United States Patent
Len

(10) Patent No.: US 9,492,871 B2
(45) Date of Patent: *Nov. 15, 2016

(54) AUTOMOTIVE WHEEL CNC (COMPUTED NUMERICAL CONTROL) LATHE

(71) Applicant: Brian Len, Coral Springs, FL (US)

(72) Inventor: Brian Len, Coral Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/506,801

(22) Filed: Oct. 6, 2014

(65) Prior Publication Data
US 2015/0020655 A1    Jan. 22, 2015

Related U.S. Application Data

(63) Continuation of application No. 13/247,108, filed on Sep. 28, 2011, now Pat. No. 8,850,936.

(60) Provisional application No. 61/387,047, filed on Sep. 28, 2010.

(51) Int. Cl.
*B23B 5/00* (2006.01)
*B23B 5/28* (2006.01)
*B23B 31/16* (2006.01)
*B23P 6/00* (2006.01)

(52) U.S. Cl.
CPC . *B23B 5/28* (2013.01); *B23B 5/00* (2013.01); *B23B 31/16275* (2013.01); *B23P 6/00* (2013.01); *B23B 2215/08* (2013.01); *B23B 2231/34* (2013.01); *B23B 2260/124* (2013.01); *Y10T 82/18* (2015.01); *Y10T 82/2552* (2015.01)

(58) Field of Classification Search
CPC ..... B23B 5/00; B23B 5/28; B23B 31/16275; B23P 2215/08
See application file for complete search history.

(56) References Cited

U.S. PATENT DOCUMENTS

| | | | | |
|---|---|---|---|---|
| 4,777,713 A * | 10/1988 | Kitamura | ............... | B23B 3/065 29/27 C |
| 7,043,805 B2 * | 5/2006 | Tokuma | ................. | B23B 3/168 29/27 C |
| 7,240,412 B2 * | 7/2007 | Sasazawa | .............. | B23B 3/065 29/27 C |
| 7,243,584 B1 * | 7/2007 | Gatton | ................. | B23B 31/102 82/112 |
| 7,506,423 B2 * | 3/2009 | Iwabuchi | ............... | B23B 3/065 29/27 C |
| 7,802,501 B1 * | 9/2010 | Topil | ...................... | B23B 25/00 82/152 |
| 8,353,095 B2 * | 1/2013 | Hall | ......................... | B23B 3/02 144/46 |

* cited by examiner

*Primary Examiner* — Will Fridie, Jr.
(74) *Attorney, Agent, or Firm* — David W. Barman

(57) ABSTRACT

The present invention is a novel machine for repairing damaged wheel rims whereby the machine is a combination CNC and manual lathe configured of performing all of the required tasks for repairing damaged wheel rims in a single unit.

5 Claims, 13 Drawing Sheets

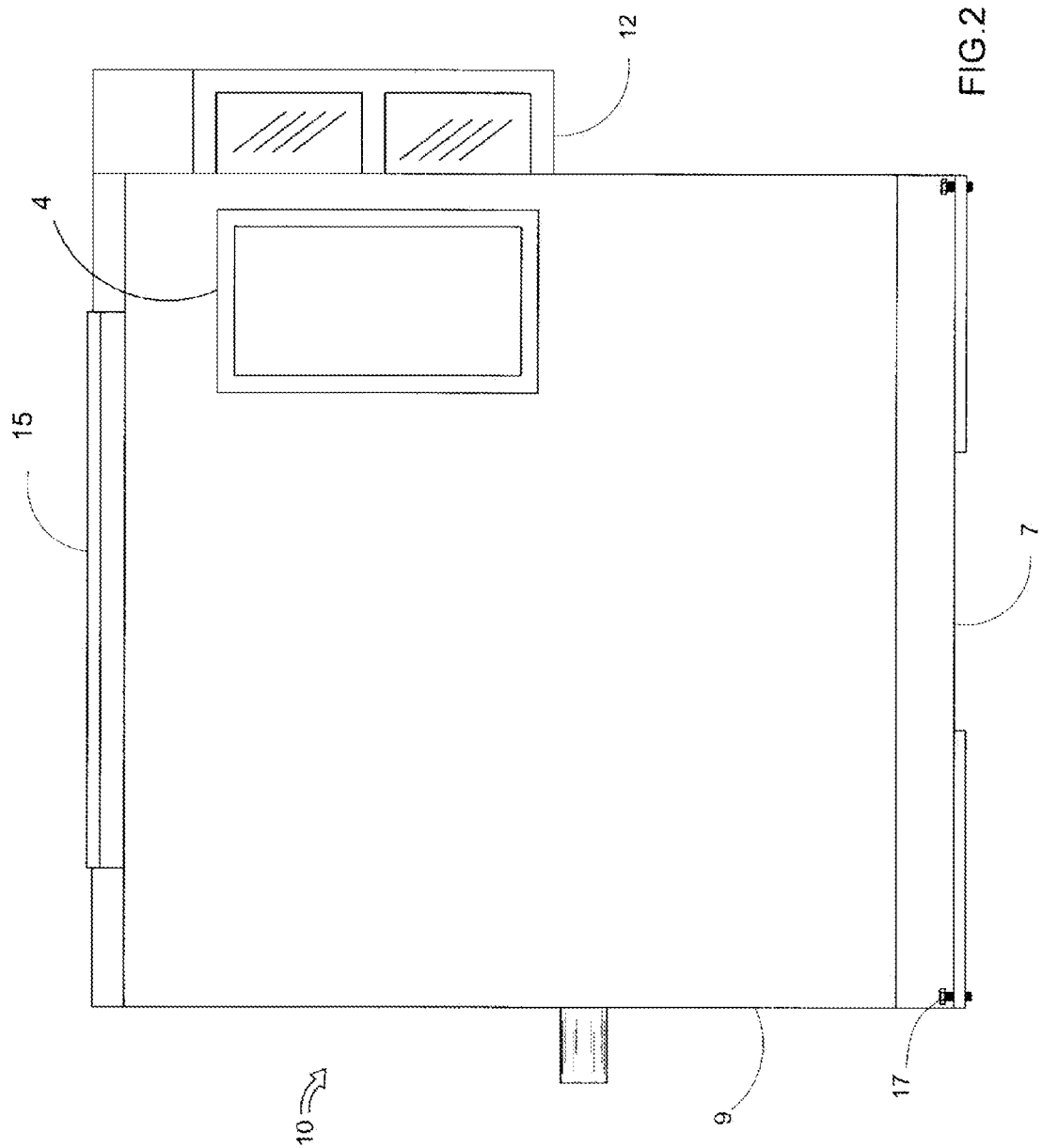

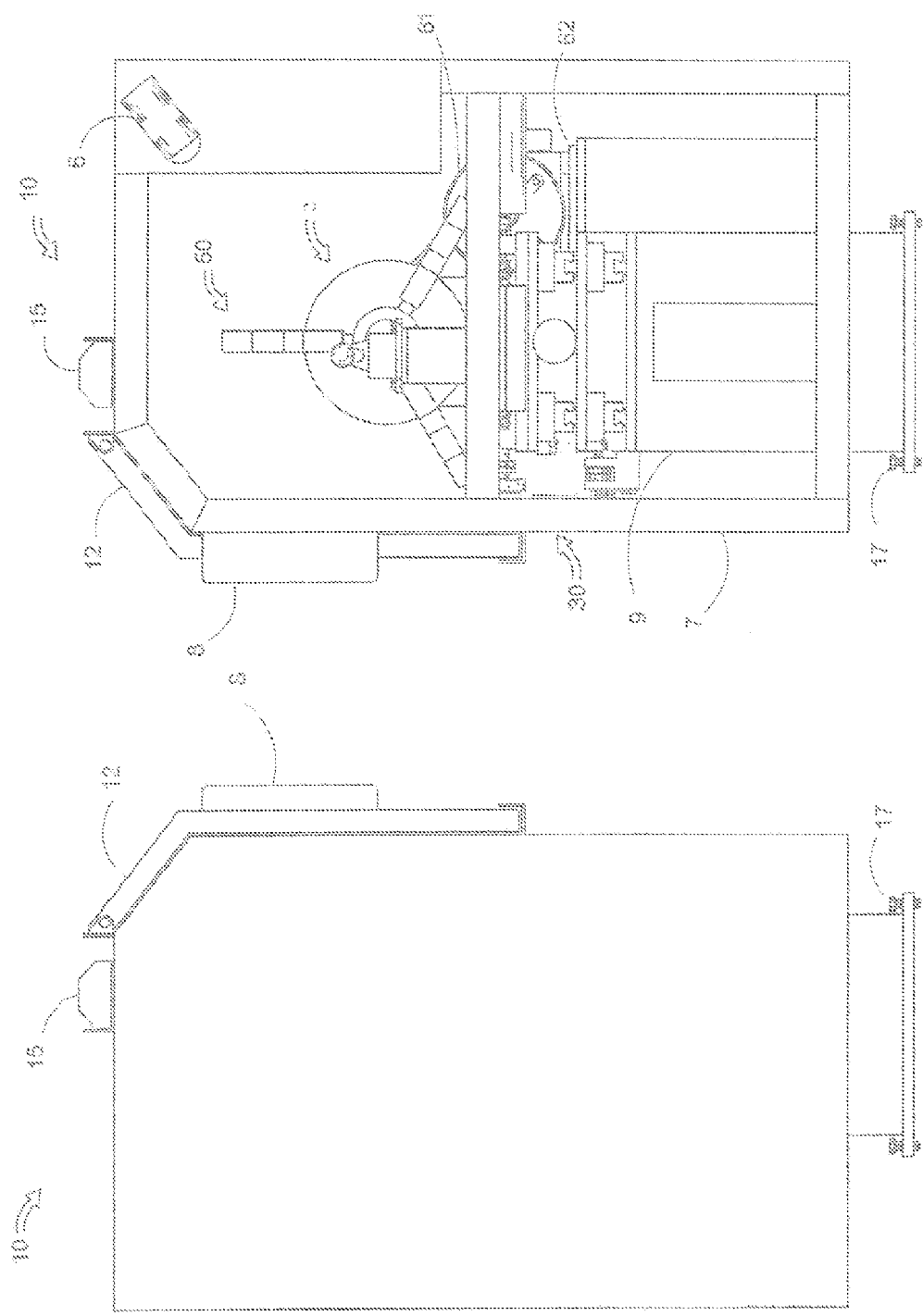

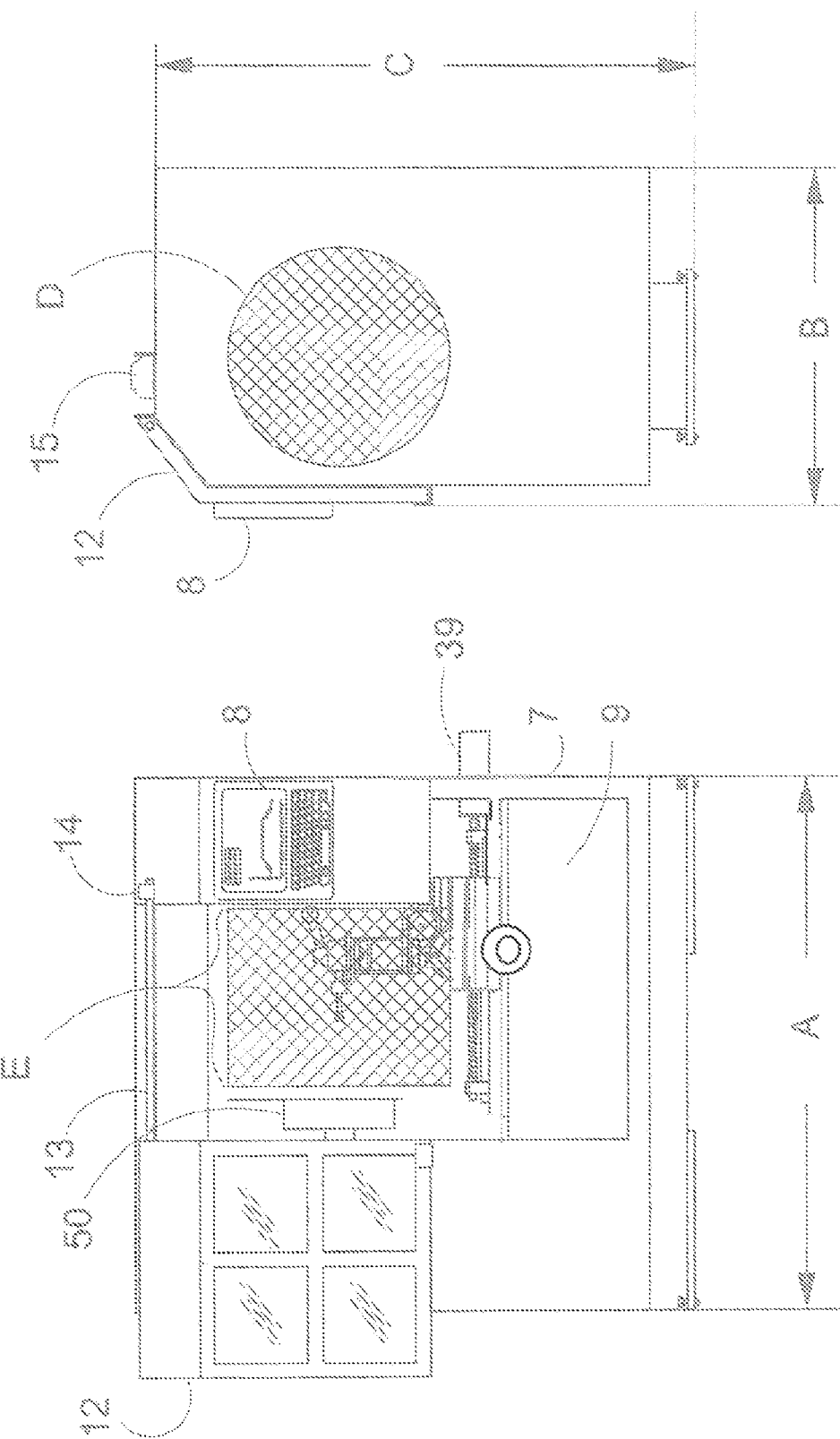

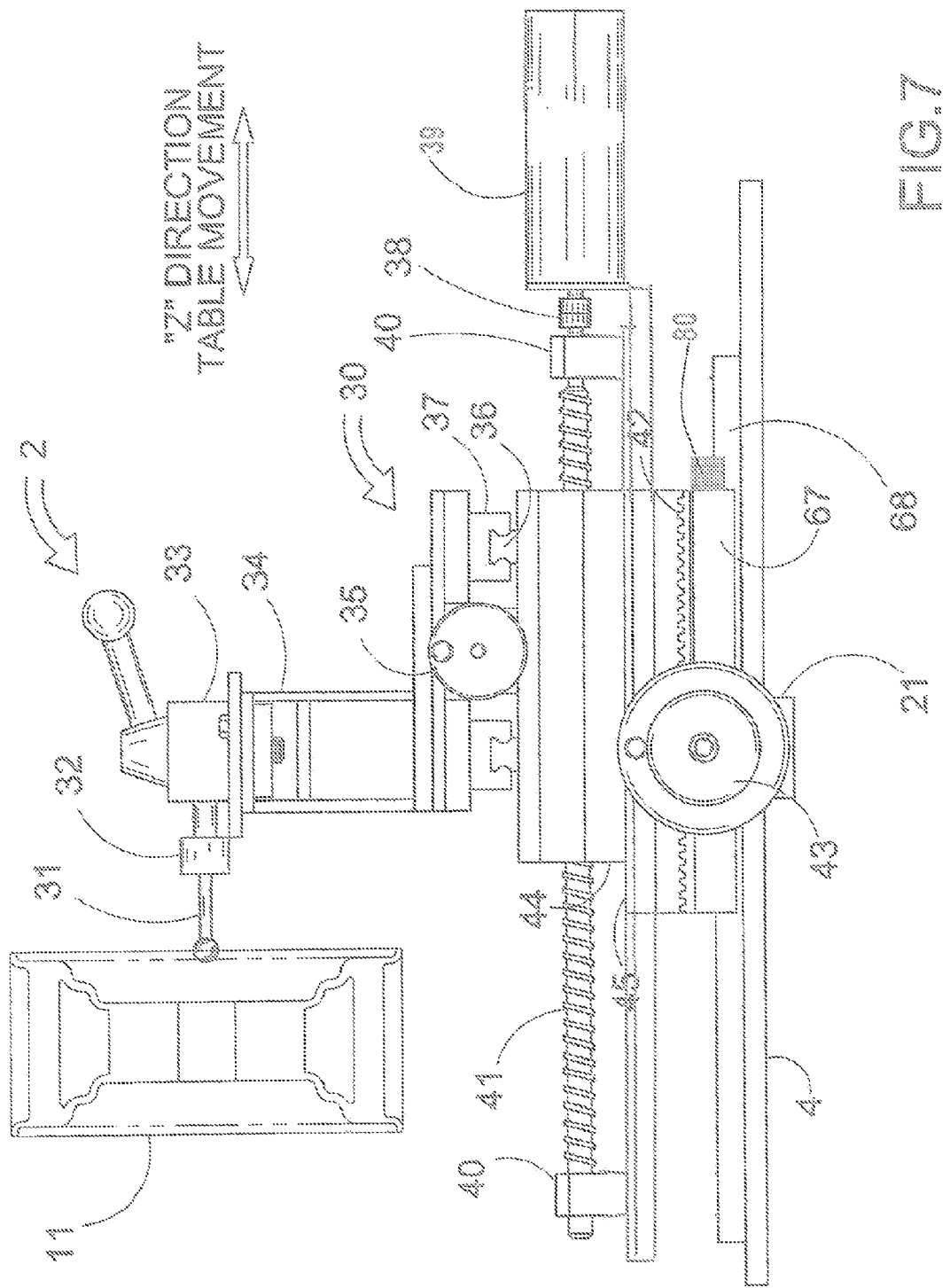

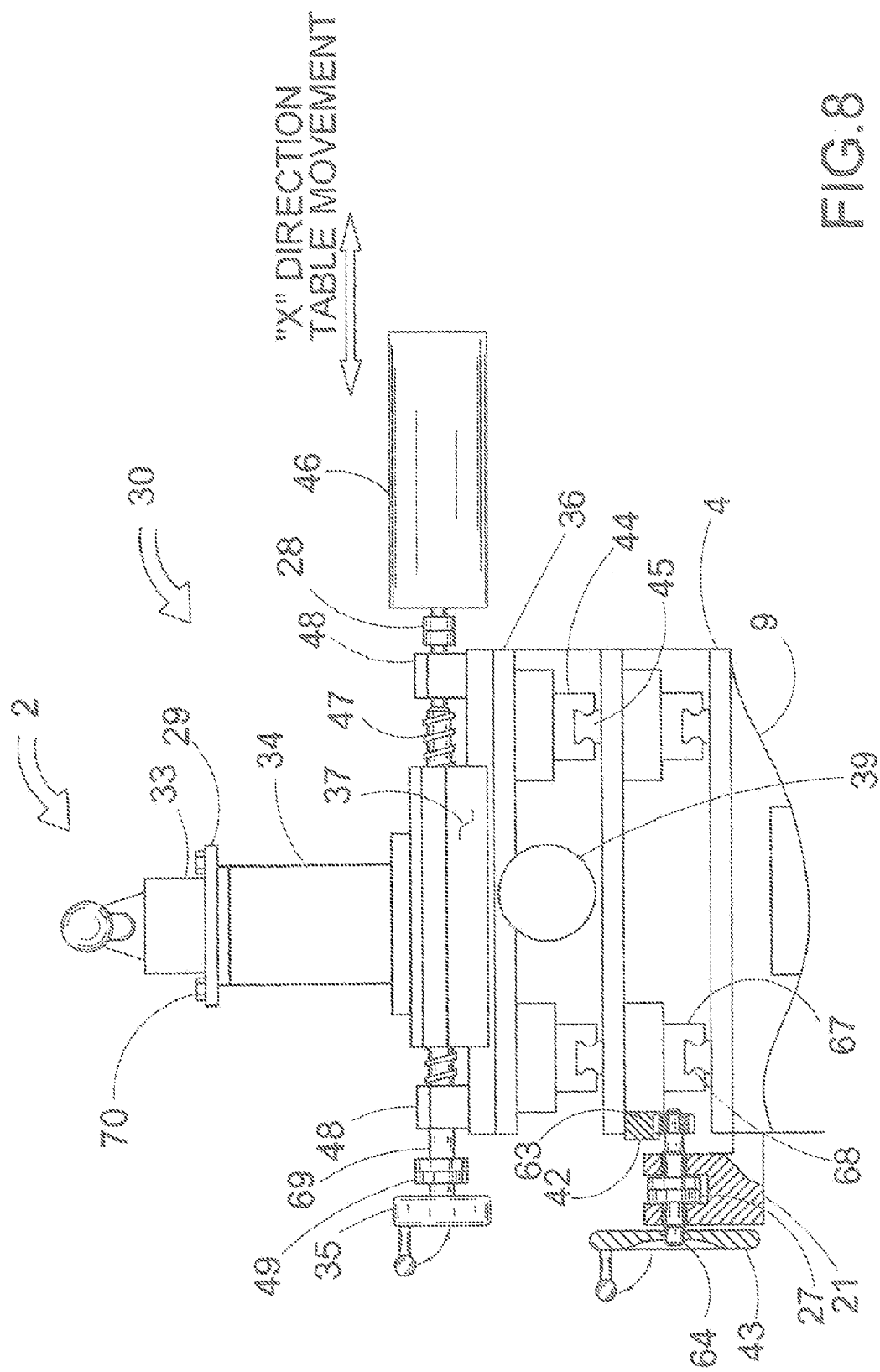

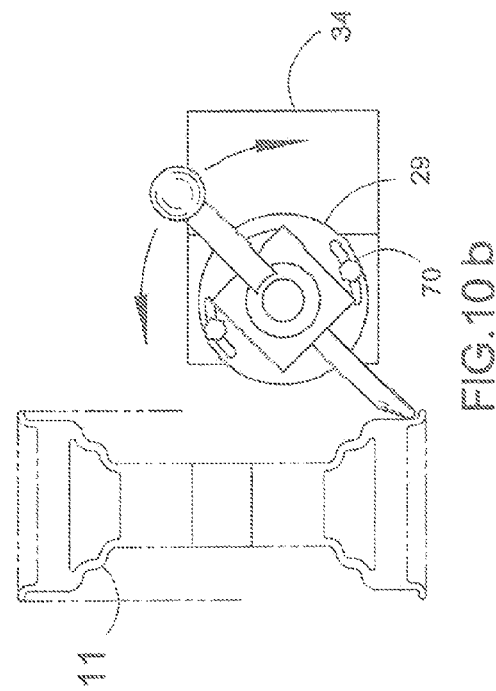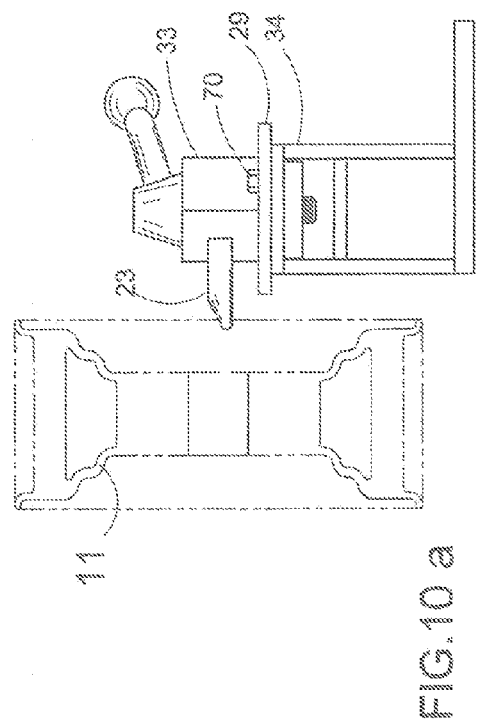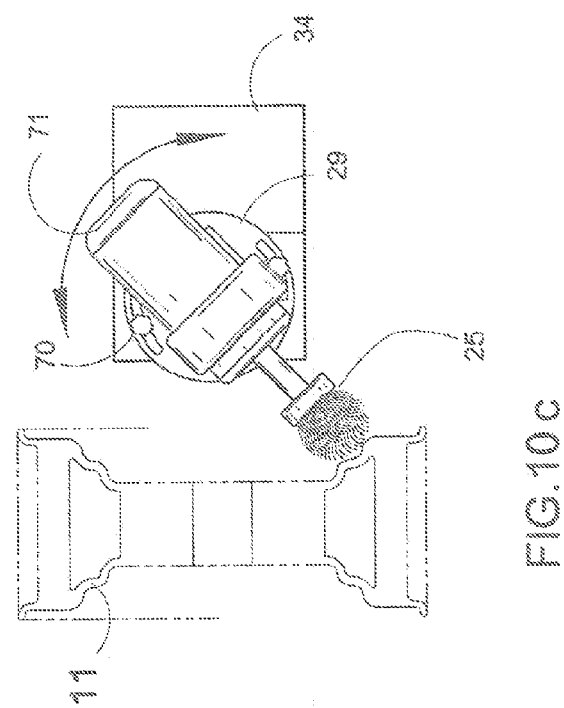

SECTION OF FIG.1

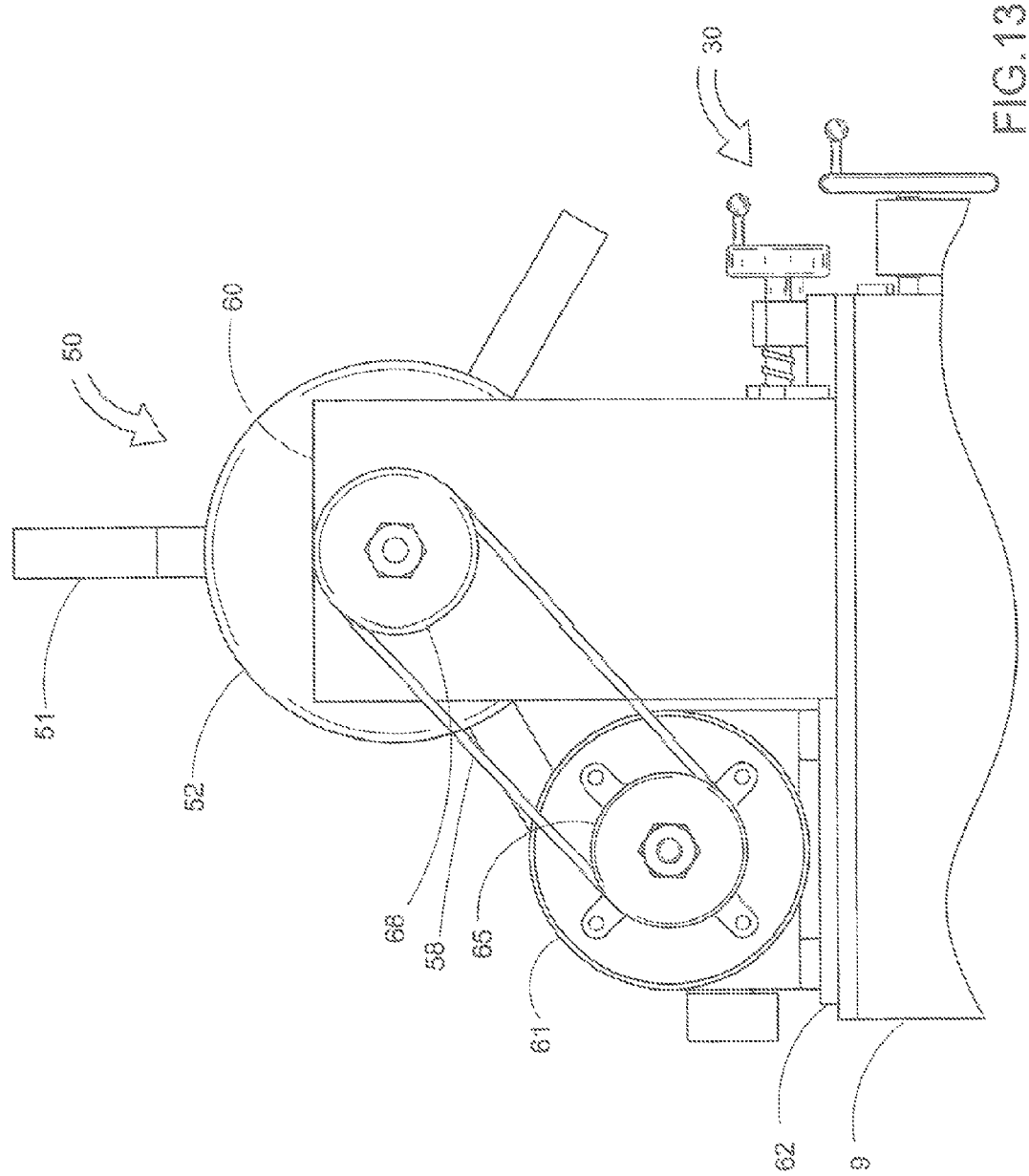

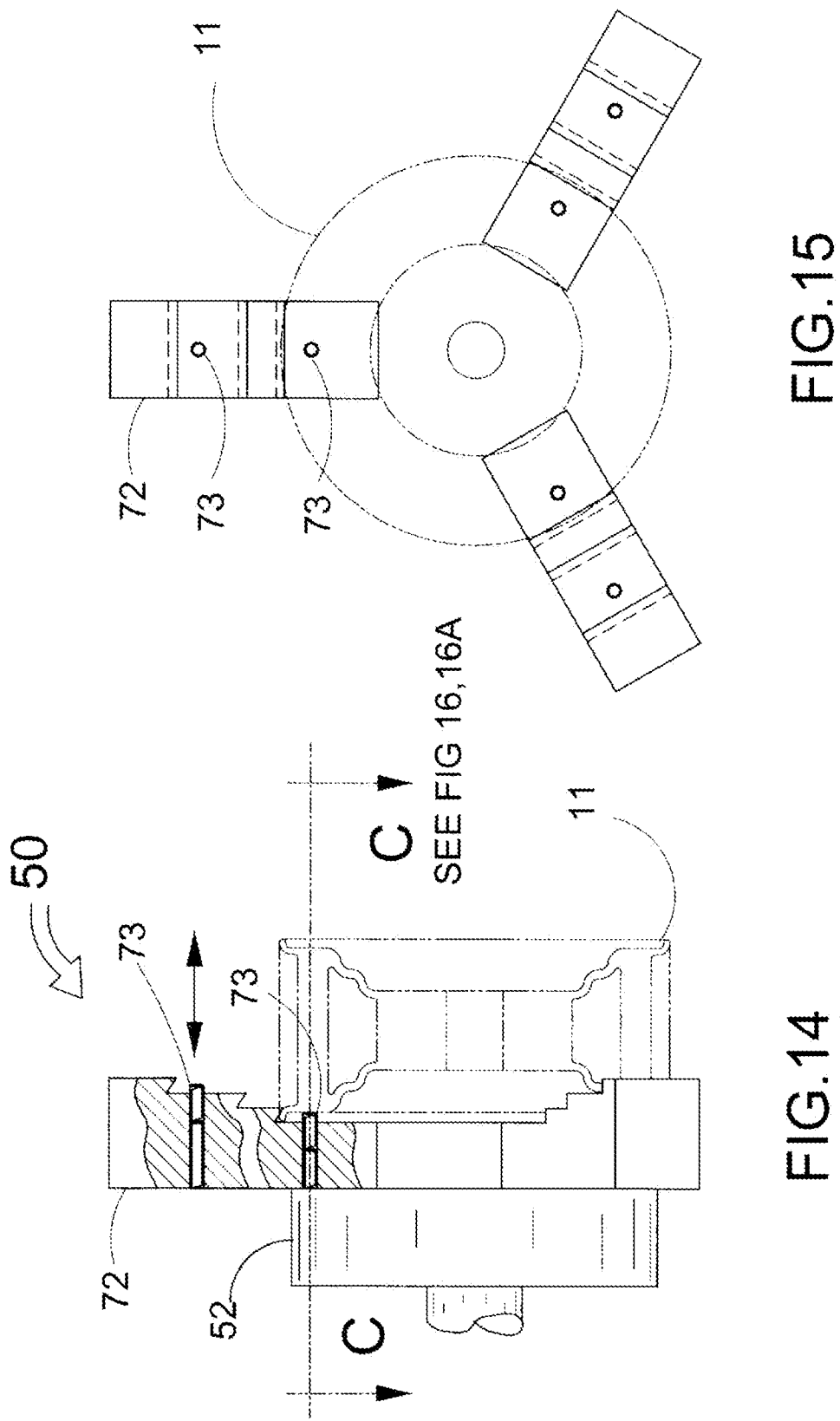

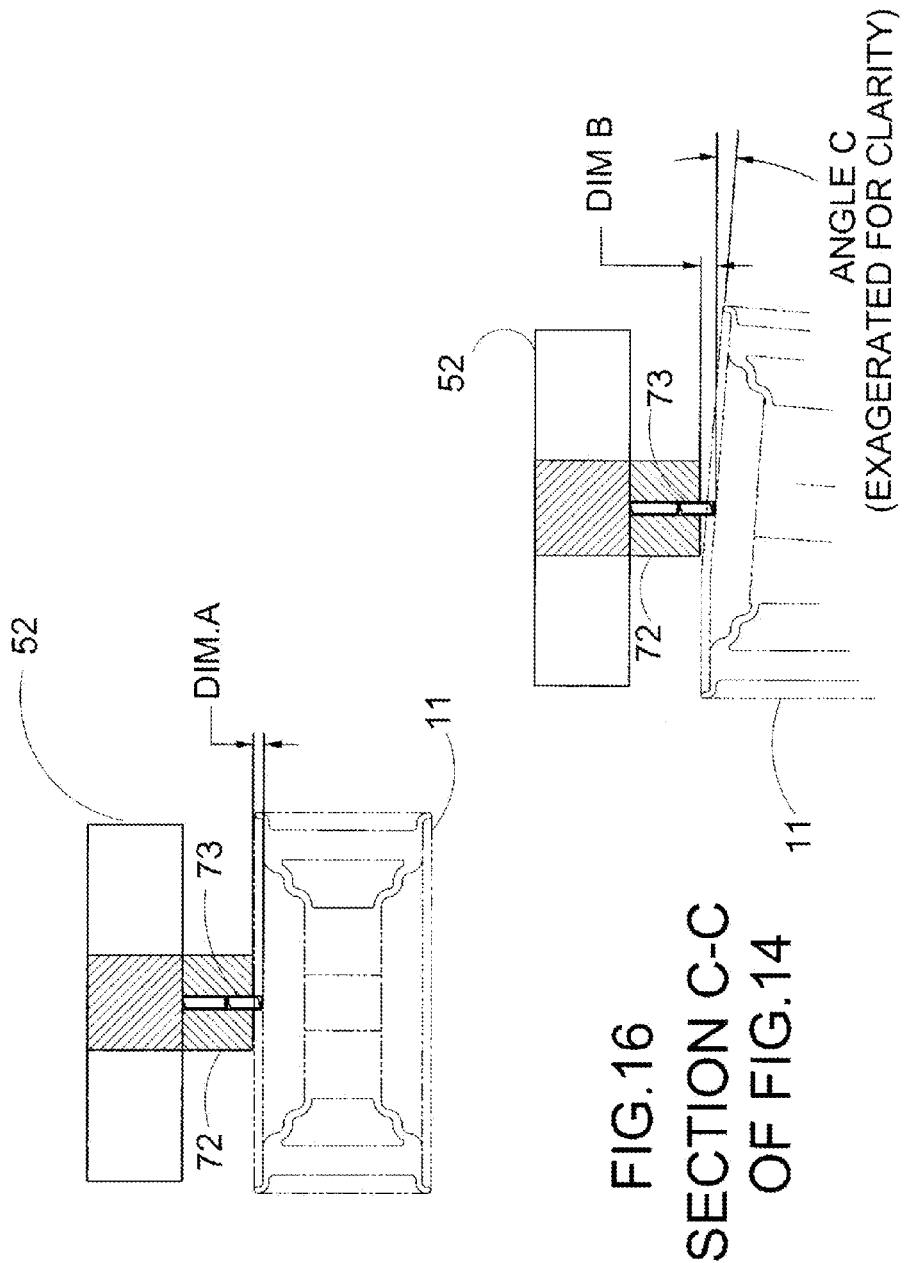

AUTOMOTIVE WHEEL CNC (COMPUTED NUMERICAL CONTROL) LATHE

INDEX TO RELATED APPLICATIONS

This application is a continuation of U.S. Non-Provisional patent application Ser. No. 13/247,108, filed Sep. 28, 2011 which claims benefit of U.S. Provisional Patent Application Ser. No. 61/387,047 filed Sep. 28, 2010, the disclosures of which are incorporated herein by reference in their entirety.

BACKGROUND OF THE INVENTION

The present invention relates to a method and device for repairing wheel rims, and more particularly, to a method and device for repairing the rims of automobiles after the rims have been dented or bent out of shape.

In accordance with one aspect of the present invention, there is provided a machine useful for repairing the rims of wheels. The machine may be used with wheels of any composition including, but not limited to metals, metal alloys, composites and the like. According to a further aspect of the present invention, a method is provided for repairing the wheel rims of motor vehicles.

BRIEF SUMMARY OF THE INVENTION

The present invention is a machine for refinishing of repairing of damaged wheel rims comprising: selective operability as a manual lathe, CNC lathe, or combinations thereof; a rotational wheel rim holding spindle; a jaw for holding a wheel rim, said jaw having plurality of angular surface features that further secure said wheel rim; set screws imbedded in said jaw, wherein said set screws extend outward from an interior channel formed in said jaw and are utlized to level a wheel rim held in said jaw; at least two platforms for supporting a tool post; wherein said tool post is movable along at least 2 of an x-axis, a y-axis, and a z-axis.

The machine spindle is rotatable by moving a wheel rim secured thereto. The tool post is rotational about on an axis and is moved manually, by a computer controlled program, or combinations thereof. The machine selective operability in manual or CNC mode is performed while said wheel rim remains in said spindle.

The machine has a large swing about the spindle relative to size of a machine frame.

BRIEF DESCRIPTION OF THE DRAWINGS

FIG. 2 is a rear view of the machine.
FIG. 3 is a left-side view of the total machine.
FIG. 4 is a right-side view of the total machine.
FIG. 5 is a partial front view showing the available working tool volume.
FIG. 6 is a view from the right side showing the available total tool volume.
FIG. 7 is an expanded view of the assembly of item 30 demonstrating slide tables from a front view.
FIG. 8 is an assembly of item 30 demonstrating XZ slide views in a right side view.
FIG. 10A demonstrates a front view of rotatable tool holders about a central axis.
FIG. 10B is a top view of rotatable tool holders about a central axis.
FIG. 10C demonstrates rotatable tool holders showing a polishing brush rotatable on an assembly about a central axis.
FIG. 13 is an expanded view of the assembly drive motor and machine base as viewed from the left side of the machine.
FIG. 14 is an expanded partial cut away front view of a jaw 51 holder with leveling screws holding a wheel rim.
FIG. 15 is a front view of the jaw 51 holder for a wheel rim.
FIG. 16 is a section view of section C-C from FIG. 14.
FIG. 16A is a section view of section C-C from FIG. 14 with an exaggerated angle C for clarity.

DETAILED DESCRIPTION OF THE PREFERRED EMBODIMENTS

Figure 1:
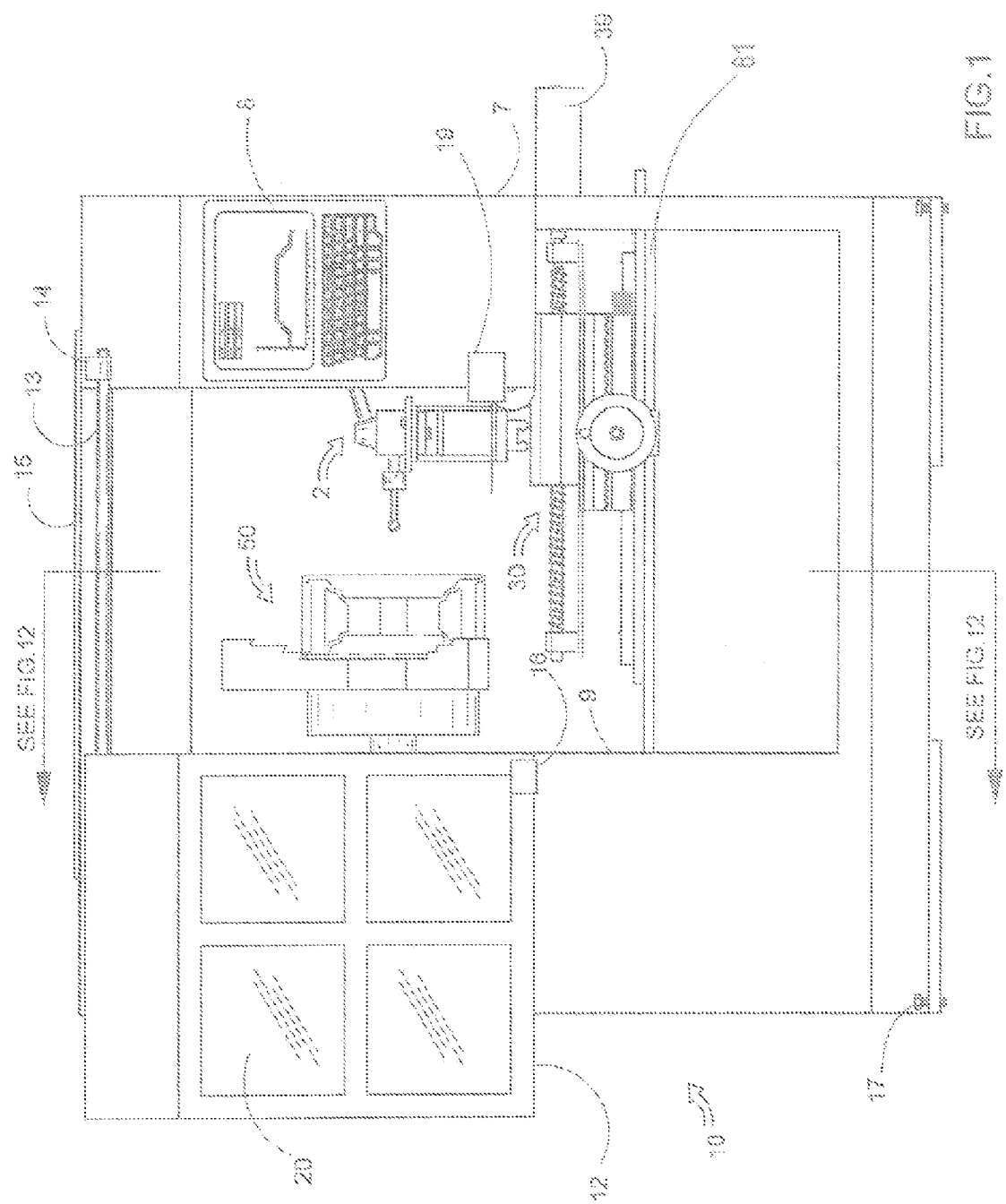
FIG. 1 is a front view of the machine.
Figure 9C:
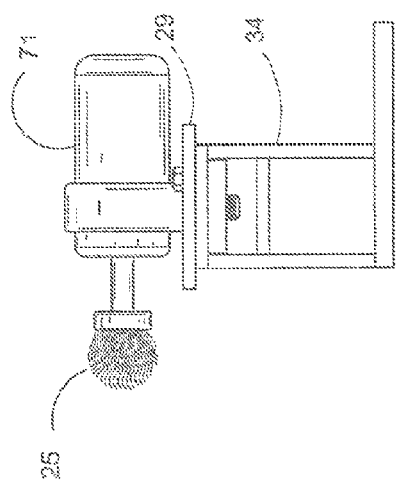
FIG. 9C demonstrates a typical working burnishing brush.
Figure 9D:
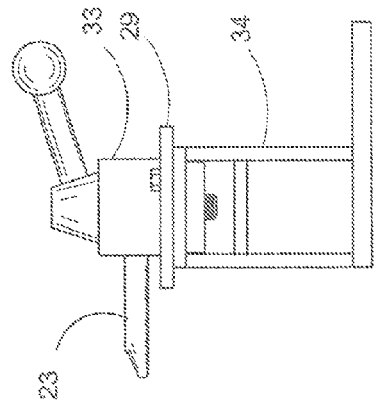
FIG. 9D demonstrates a typical working tool being a burnishing brush.
Figure 9A:
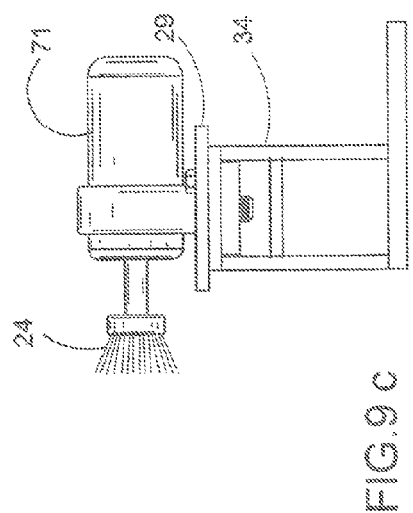
FIG. 9A demonstrates a typical working tool being an electric digital probe.
Figure 9B:
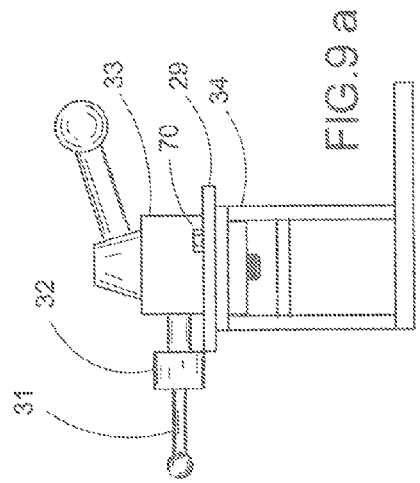
FIG. 9B demonstrates a typical working tool bit.
Figure 11:
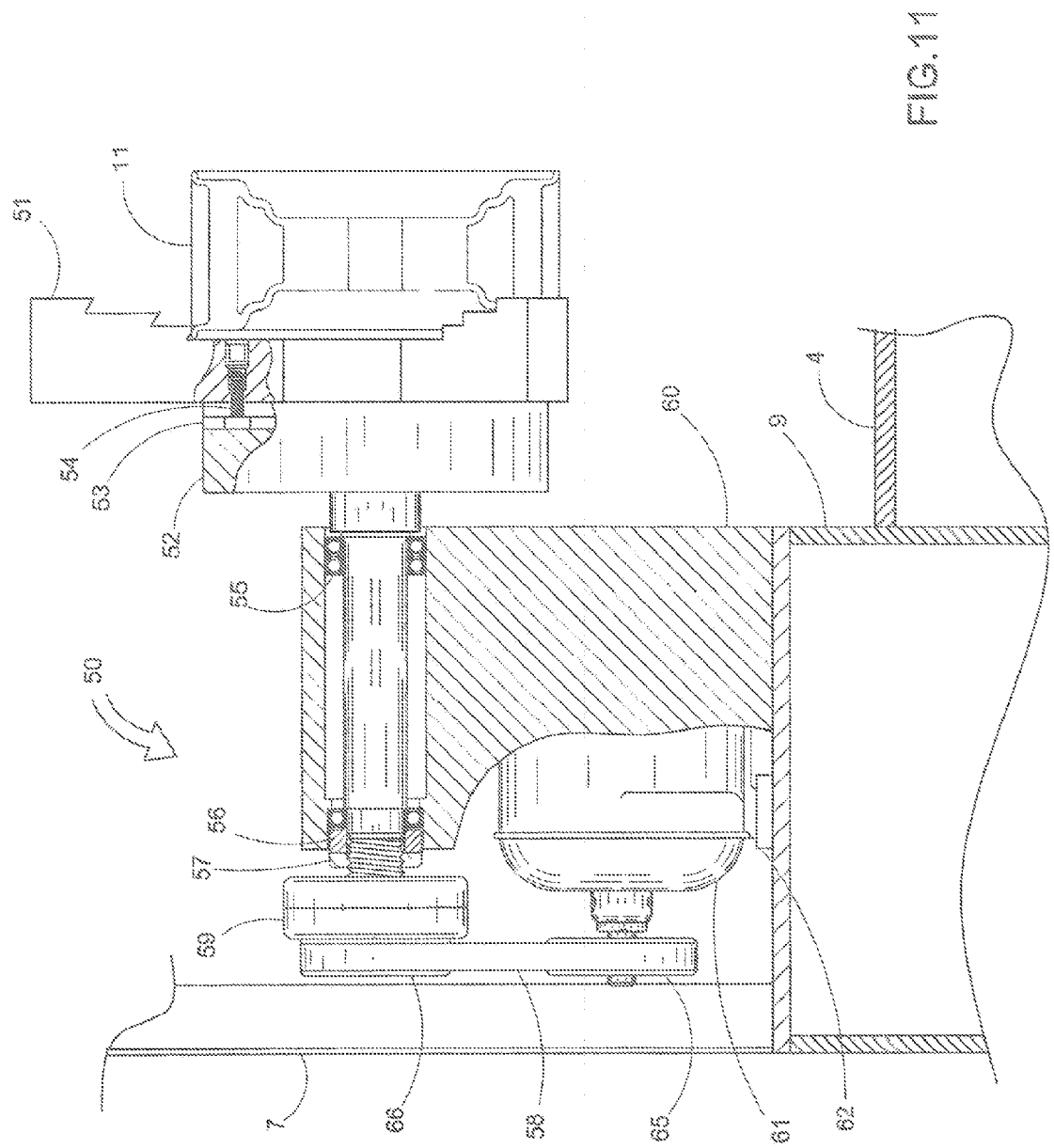
FIG. 11 is an expanded front view of the assembly of item 50 showing the chuck and drive mechanism.
Figure 12:
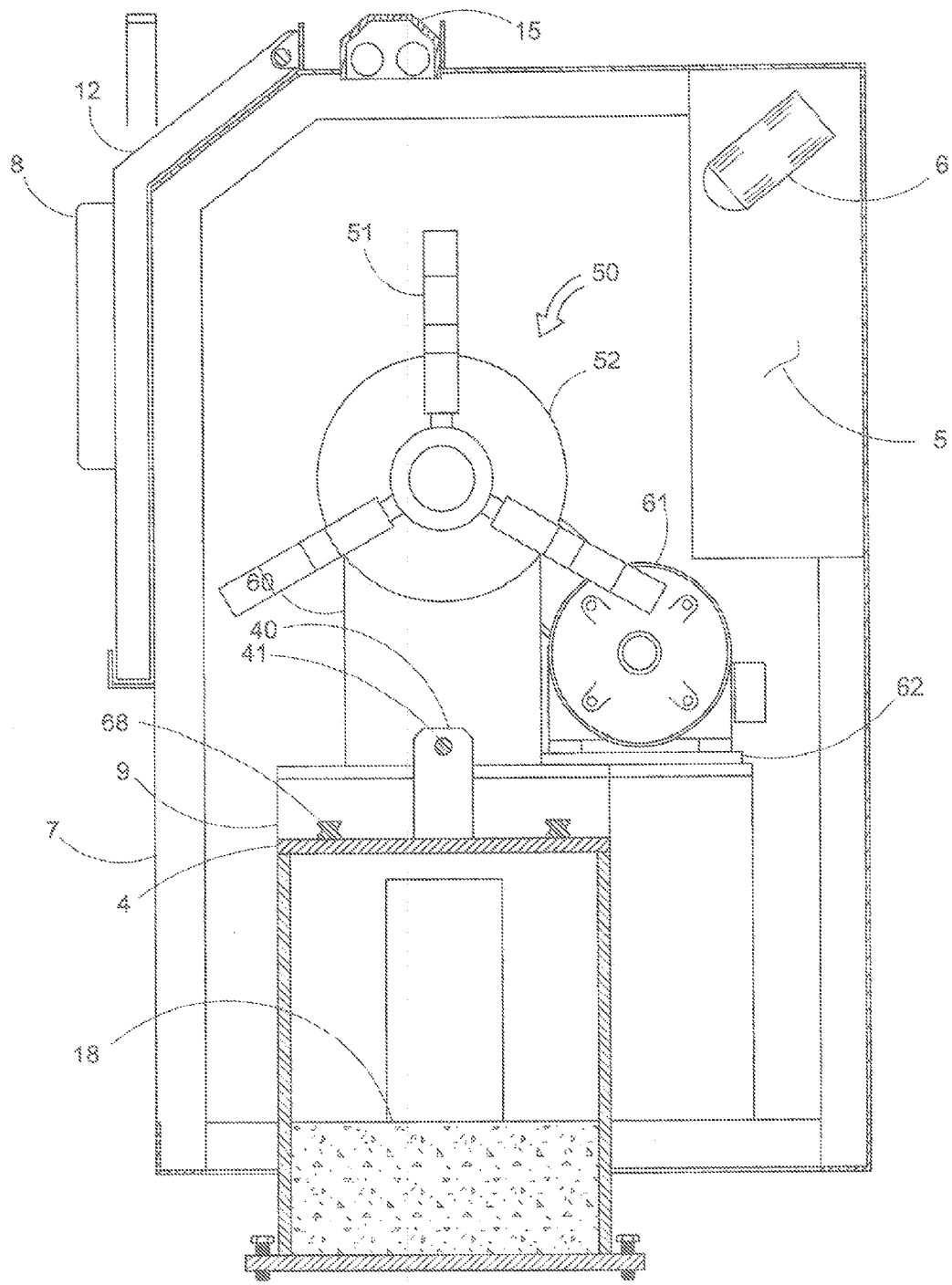
FIG. 12 is a cross section of FIG. 1 along section lines from FIG. 1.

Machine lathe 10 as described herein references the total assembly. The machine is formed of various subassemblies each numbered for the sake of description. Headstock mechanism 50 acutely secures an article to be machined in a desired position. Tool post mechanism 2 provides for guidance of various typical working tools, bits, probes and the like used in the machining process. Sliding table mechanism 30 provides for movement of the entire tool post mechanism 2 in order to effectuate machining with applicable working tools, bits, probes and the like. The machine lathe 10 further includes a microcomputer system 8 whereby automated machining can be controlled. Microcomputer 8 is operatively associated with the various movements of tool post mechanism 2 and other such mechanisms to provide computer control machine lathing. Machine lathe 10 further encompasses at least one door 12 and at least one transparent window 20 that slideably moves along safety door sliding rod 13 and is secured into a fixed enclosed position with safety door bracket 14. A light fixture 15 is installed on the interior of the machine such that light fixture 15 illuminates a working article when door 12 is in a closed position. Door 12 is secured into a closed position by door latch 19. Machine envelope frame 7 is a welded steel frame and is secured to machine base 9. Machine base 9 and machine envelope frame 7 support each of the component parts of machine lathe 10. Machine base 9 has incorporated therein leveling devices 17 which are adjustable such that machine lathe 10 can be leveled even if the surface upon which machine lathe 10 is residing is not completely leveled. As shown in FIG. 2 machine lathe 10 has incorporated thereon a base plate for which is removable and provides for internal access of electrical power supply and microcomputer assembly 8. As seen in FIG. 4 a drive motor 61 is mounted on a motor mount 62 and interacts with headstock 50 that holds an article to be machined such that tool post 2 provides for interaction with the article to be machine lathed. FIG. 5 is a front view showing the working space for machine lathe 10 in one embodiment dimension A being the overall lathe bed is approx 48 inches long by 20 inches wide The floor size of machine is about 72"×48". Dimension C being lathe height is approximately 73 inches. Dimension D is the tool clearance diameter being the maximum throw of approximately 30 inches. Dimension Z is the lathe tool bed range of approximately 24 inches. It has always been a problem in the wheel repair industry to obtain a lathe that is small in floor footprint but with a large diameter swing. Swing is the maximum diameter of the workpiece. Some lathes are designed with a gap between the bed rails that allow the part to swing below the bottom of the headstock. The reason for this is that production machines increase length of machine with swing. This is a industry norm. There are not many machines at all that have such a large swing without removing the gap. The problem with a machine that has the possibility of removing the gap is that this would only create a larger swing over a short distance along the bed. This would normally be helpful in working on a flat round plate of not more that a few inches wide. With a wheel in place in the jaws it would extend past where the gap was thus making the removal of the gap useless.

As per FIG. 5 the working space is a ratio of approximately 1:1.in working area. in other words there is approximately 30 inches of swing over bed with about 30 inches of tool post travel. There is no need to have a long bed for a relatively narrow wheel. However it is desired that the swing over bed to accommodate the larger wheels manufactured today. In keeping the bed length short and widening the swing over, a more realistic and economical machine is created.

As seen in FIG. 7 the directional movement is effectuated as follows: Product piece 11 is a typical article in which machine lathing is desired in one embodiment of the present invention article 11 is a wheel rim. Tool post assembly 2 holds a probe 31 or other typical working tool, bit or other working tool or bit to be used in the lathing process. Barrel 32 is a steel barrel with set screws to lock probe in position and secures probe 31 into position. A quick released tool retainer 33 is a fixed on top of tool mount 34 such that the entirety of tool post mechanism 2 is moved by table mechanism 30. Table mechanism 30 is formed of a hand wheel 35 for the "X" slide whereby table mechanism 30 is moved along an x axis by either the hand wheel 35 or the servo motor 46 attached to the other end of the ball screw 47. Table mechanism 30 is further moved by x slide rail 37 that moves along x slide mount bar 36. Movement along the x axis is accomplished through rotational movement of hand wheel 35 when power is removed from servo motor 46. When servo motor 46 is powered up then said movement is created along slides by motor 46 rotating ball screw 47. Z slide hand wheel 43 moves along a z direction through corporation of a pinion gear 63 that runs along manual z rack 42. Movement within z slide mount bar upper 44 and z slide rail upper 45 is initialized by rotation of z servo motor 39. As used herein an x movement of the slide is relative movement That will run parallel to the face of the automotive wheel 11. and is provided by x slide mount bar 36 and provides the desired motion. As used herein the z direction is provided by lead screw 41 that is supported by a pair of lead screw end mounts 40. The mechanism moves by virtue of interaction of z lead screw 41 with z slide mount bar 44 and z slide rail 45. As seen in FIG. 8, the x direction of movement provides movement of tool post assembly 2 mounted on table mechanism 30. Tool holder 33 is mounted on rotational plate 29 and fastened into position with fastening bolts 70. Slide rail 37 connects to tool post assembly 2 by support 34 being tool mount 34. In use an operator will open safety door 12 in order to access the working mechanisms of machine lathe 10. Article 11, in this example being non-limiting article 11 is an automotive wheel rim is attached to headstock 50. Headstock 50 is constructed and arranged as a truck and drive assembly with a chuckjaw or jaw 51 and a headstock shaft 52 as best seen in FIG. 13. A t-bolt slot 53 allows for t-bolt 54 to be placed therein. Bearing 55 is placed within bearing spacer column 56 and locked into a fixed position through bearing retainer nut 57. Drivebelt 58 interacts with electromagnetic clutch 59 and is moved by virtue of connection with motor pulley 65 rotational movement of motor 61 turns motor pulley 65 moving drivebelt 58 and subsequently turning tailstock pulley 66. The rotational movement imparted by rotational motion of motor 61 ultimately turns automotive wheel 11 in a rotational manner. The fixed rotational movement of automotive wheel rim 11 allows it to be machined through any of the appropriate machine tools that will ultimately contact automotive wheel 11 by virtue of movement of tool post assembly 2. In one embodiment, shown in FIGS. 14 and 15 headstock 50 supports a chuck jaw 72. Chuck jaw 72 has a plurality of angular surface features that further secure a wheel rim 11 while being machined on machine 10. Chuck jaw 72 has incorporated therein a plurality of set screws 73. The set screws can be unscrewed outward from the surface of chuck jaw 72 in order to provide a horizontal level to wheel rim 11.

CNC/Manual Abilities with Reference FIG. 7:

There are two independent methods of moving in and out in the Z direction. This is a method that has not been done before. The lower slides 68 will harness any movement created by hand wheel 43 with transfer through a rack and gear 42 to create travel in a z direction along 68 the lower z slide rail. This movement will in effect move the complete machine from that point up. The machine can then be moved manually toward and away from the wheel 11. One level up there is another set of set of z slide rails/upper 45 which is under power by z servo motor 39 with transfer through ball screw 41. As mentioned previous, these methods of movement are in the same z direction and act independently of each other.

With this in mind, we can now do two things as a result of this. One is that as we don't need any homing in this machine as start values are set for every new wheel on the machine, we can now use this to create both manual and cnc movement.

On the one hand the manual and CNC can work independent or in unison with each other. Should the brake 72 be in the locked position then just the CNC would be working. Should the brake be unlocked then while the cnc is running a program (i.e. cutting a wheel) adjustments can be made by the operator to cut just that little bit more, or less, in a specific area on the wheel. This would be beneficial in the event that there is a deep gouge in a certain area of the wheel and be best to cut only deeper in that specific spot, the operator would very slowly move hand wheel 43 in at that area and then begin moving it out after the CNC has passed the bad spot.

Machine lathe 10 is uniquely configured to selectively operate as either a CNC (Computed Numerical Control) lathe or a manual lathe. The CNC is used mainly for the correction of cosmetic damage to the face of a wheel rim.

There are certain wheels that are known to have a diamond polish, also known as a machined finished. The side of the wheel rim (i.e. the side visible when mounted on a car), is originally factory cut to a certain given shape. The final cuts are then made with a diamond shaped insert so as leave a bright, bare metal, screw cut type look. This finish has become popular on many of the wheels that are available today.

In the case that one of these wheels are cosmetically damaged, a light trim with the lathe on "CNC mode", would be able to correct that.

Machine lathe 10 is used in manual mode to give the operator the ability to hand finish or hand repair certain conditions on a wheel without the assistance of any motors or electrical assists.

A conventional, or off the shelf lathe is suited for many purposes and possible jobs, a large machine with a large footprint to be able to accept wheels in the sizes that are manufactured in present times today.

Machine 10 of the present invention is constructed and arranged to accommodate the wheel sizes and shapes and instead of the wheels being accommodated by the machine, the machine 10 is built to accommodate the wheel. It is thus capable of doing large and small wheels and still having a small footprint, thus reducing floor space needed.

It is an advantage for any wheel shop to have both a CNC lathe and a fully manual lathe. In other words two separate machines are normally needed.

For ease of operation, machine 10 is combined into one within the new Automotive wheel CNC (computed Numerical Control) lathe. This machine is now capable of either being a complete CNC machine on the one hand, or with the push of a button, it can convert to a fully manual machine on the other.

The manual machines movement of tool post within its axis is initiated by a human with the turning of hand wheels, that manually will move method of traverse (e.g. ball screws, lead screws or rack). This will in turn create movement of the desired tool post.

The chuck will be controlled by an on/off switch with speed selection that will be controlled manually by the operator of machine. Thus the machine will be controlled totally by operator.

The same movement can be created by a similar method on most CNC machines, the manual turning of the hand wheel is transferred to electrical methods of controlling the servo motors to move method of traverse, (e.g. ball screws or rack) which will in turn move the tool post. In other words, all manual movements are transferred into electrical and thus not a totally manual machine.

Manual lathe machines are not powered via a computer control. All actions are carried out by an operator. This is necessary in some instances where certain procedures need to be carried out with human judgment and control. The chuck will still be powered by a motor, but speeds and on/off power is controlled by the operator of machine. The tool post movement is not created by a motor or computer at all. It is initiated by a hand wheel which is physically turned by the operator and thus will create the desired resistance between the part and the cutting tool.

The distinguishing factor of why the machine should be totally manual and not partially, is that the operator gets a feeling of resistance on the hand wheels when there is no electrical assist. At times, it is necessary to round off corners without cutting too deep into the surface of wheel. This becomes possible with a totally manual machine operated by a skilled artisan.

Should this be tried on a CNC machine with hand wheels, no resistance is felt and much deeper than desired cuts can be made that may damage the wheel rim beyond repair.

In a CNC machine, the movement of tool post and chuck are controlled by the computer, thus the term computed numerical control. The computer will command that power be supplied to motors in controlled amounts, to rotate at given speeds via the control unit which gets feed back from an encoder attached to motor. With this information, the computer can now track the updated location on the grid.

Thus, the computer will know where the tool post is located on the "X" and "Z" grid. In saying this the computer will also control speed of rotation of chuck. So, if a pattern to follow or program is loaded on the computer that has all this information stored, the computer now has the ability to complete the run with out any assistance from a human.

The combined CNC/manual lathe 10 provides several advantageous over conventional machines including, but not limited to: Saving job time—If a wheel is already on the machine, there is the possibility of doing some repair work and then at the same time doing cosmetic work which is a time saver as set up time is reduced; Space—this machine will eliminate the need for two machines that require large floor area; energy consumption—the machine of the invention is built to have enough power to complete any wheel related job. A regular production machine that is large enough for wheels will be an overkill on motor sizes etc. and will thus need much larger amounts of energy to complete the same job on same wheel; Cost of equipment and setup—all costs will be reduced as machine is smaller, item specific and is two machines in one; Ease of use—the machine is built for one purpose, namely wheels. The programming etc. is based on this as well as the size as are many other factors too numerous too mention.

Machine 10 is Unique in Combining Axis Movement or Motion on the CNC/Manual Lathe:

The CNC/Manual combination lathe machine 10 of the present invention is capable of doing full CNC work with movement created by either motors or hydraulics, but also has the ability to do fully manual controlled movements created by the operator with hand wheels without any electrical assists. This is made possible in two different ways.

The first will be called multi level stacking of platforms. The second is to enable rotation of one ball screw by two or more methods of power transfer.

The first, with the aid of the multi level platforms that enable movement on the same or different axis. An example of this is where there will be two or more separate platforms that will travel in the same direction. In other words, there may be two or three platforms of travel on the x axis alone. In this event the one platform will be controlled by a motor (for CNC work). The second may be controlled by a manual hand wheel (for manual lathe), while a possible third level may include hydraulics.

The bottom "Z" axis can in fact be thought of as an axis that can in fact move the complete cnc machine forward and back as all the motors etc will be on platforms that are on top of the bottom axis. This lower platform can thus bee totally free of any motors and can be totally manual in all aspects as there is no electric or motors controlling it. It can either be manually moved or locked in place so as to allow the upper platforms to work. Movement on this can either be on a ball screw or a rack and gear.

The second method is by withdrawing the power from a motor that is energizing a ball screw, the motor itself can now be manually turned. This could create a scenario where there may be a hand wheel on the one end of a ball screw and on the other end a motor. Should the motor be powered, it could turn the ball screw and if it were not, the hand wheel would be able to turn the screw and thus turn the motor as well.

So therefore it can be said that movement of ball screw, rack, or lead screw, can either be made with: A motor (electrically operated); the operator turning a dial which will in turn, manually move the screw; hydraulic cylinders; or combinations thereof. The above can control the CNC and manual movement and use of the lathe, either independently or in conjunction with one another.

All of the above methods of motion can control the CNC and manual methods of the lathe, either independently or in conjunction with one another. This will allow the combining of the two machines into one.

Machine 10 has a sturdy frame 7 that is built to accept linear rails as its guides. As the machine needs weight to provide stability, heavy duty steel and also concrete are used in the construction of frame. The weight is needed as when wheel spins there may be an imbalance caused as a result and weight in the machine itself will help in this regard.

Various methods can be used and at times could be a combination of the under mentioned methods. Linear rails— For the most part linear rails and guides are used in the present invention. In applications involving polishing wherein particulate is created alternative rails or methods of traverse may be used. Another method could be the dovetail and gib that is commonly used on production machines.

Certain lock downs are necessary in the present invention. These lockdowns will prevent any undesirable movements within any axis when the CNC part of machine is in action. The brake can lock down a manual axis and disallow these movements. Various types of brakes which normally lock upon the linear rail are used. Alternatively, any acceptable brake can be used. The two most common are pneumatic and manual. Either of the two can be used. In the event of it being pneumatic, then control of the unit will be initiated by the computer. If it were a manual then control would be by the operator of machine.

A gear box is used to create a similar direction of manual movement to that of a conventional manual production lathe. This is done so as not to confuse the operator of machine that may have may have grown accustomed to production machines. The gearbox can also have the ability to disengage the hand wheel while under power of the motor on the other end of the ball screw. This would occur when the CNC or computer is controlling machine. In this event the motor would turn the screw, but the hand wheel would not turn. However, when power is released from the motor and the manual lathe is desired, the hand rail can be depressed back in toward the gearbox, thus engaging such so that hand wheel will now in turn, turn the ball screw.

A CNC lathe will also often have hand wheels. Again the problem with this, is that these wheels generate power to servo motors which create the desired movement. The problem with this is there is no resistance and no forgiving, when a move is initiated the tool will make that move, even if the wheel is in the way.

Method of Travel:

Motors-Preferably servo over stepper motors are normally used as there travel is more constant and even, however in some cases where precision is not as necessary eg. polishing, the less costly stepper motor can be used. The obvious differences between the two are the quality and the cost. For the most part however servo motors will be used.

The machine may use ball screws or lead screws. The main difference between ball screws and lead screws is again quality. The ball screw is more precise than the lead screw. There is a difference in cost. Although the lead screws are far better in quality than was in the past, it is still desired to use the ball screw. Future improvements in the quality of the lead screws, may allow cost effective use in the future. The desired screw will have zero backlash when used in the machine.

When the ball screw turns, the nut on the screw will traverse the length of thread. This nut is attached to a upper platform and thus the platform will move as screw rotates.

A large motor 61 located within the frame of the machine will rotate the chuck 50 and wheel rim 11 via a spindle or shaft 52 with either a direct or belt driven system. An electrical brake is used to rapidly decelerate the speed. The brake is a series of resistors or capacitors.

Unlike a universal machine that was built for many differing jobs that will need a larger motor to be able to have enough torque to complete any application, machine motor can be large enough to complete a specific job and thus be sized accordingly.

With the use of an inverter that can create three phase power with a single phase input, there will be many options available. So there can now be the possibility of using single phase power to run entire machine. This is an advantage as now machine owners will not require 3 phase power. Also an advantage that power consumption will be lower than most other machines.

Computer 8 operates the CNC (computed numerical control). It is the intelligence in the machine, that makes normally complicated procedures, far simpler. There are various methods that these apparatus can be attached to the machine and the sole difference in all methods are what is comfortable for that particular machine operator. Installed on this system is the program, which will be discussed in further detail in the next few paragraphs.

As the machine can be connected to the internet, it becomes possible to use communication programs like Skype. This can allow the operator of machine to work on machine whilst getting guidance from an outside party, possibly in another country. Video and audio are possible as machine has video camera and headset.

The machine shall have an enclosure over the body that shall disallow objects to fly from within and cause possible injury to those on outside. The probable objects that may be projected is the wheel itself, however other items such as chuck keys etc could also be catapulted. The door of enclosure may for safety sake have a micro switch that will not allow the chuck to turn on, if door is not closed. The lighting within enclosure shall be bright and extend for the length of the inner chamber so that it will still be possible to see within the back and inside of the wheel. This will enable the operator to read for possible reference, numbers that are stamped within the wheel while it is mounted on chuck.

The tool post has a quick release method by rotating the lever on the top of the unit, a cam is released and the tool can slide out. This makes changing of tools and probes etc. both quick and easy. Angle of tool and positioning to wheel and within machine is also easy to adjust by loosening top nut and aligning or moving the post itself.

The running program can be made up in two different ways, but either way will essentially perform the same functions.

The first way is by building a specific dedicated program that is made from scratch from the ground up for the purpose of doing wheels. There will be no need for another program as this will perform what is needed to function with working on wheels.

The second will be an overlay of an existing off the shelf program. In other words, screens and buttons and functions will be in the form of a conversational overlay that will generate commands to an existing off the shelf program.

In both of the above scenarios there will be an operating system, which could be one of many. To some degree, should the second scenario of an of the shelf program with an overlay be used, then some other parts, other than wheels, may be able to be worked upon. The method of doing such work would be to open the off the shelf machining program and not the overlay. By doing this the machine can in fact still perform as a regular cnc lathe and thus be capable of working on parts other than wheels.

There are many smaller, but significant tasks that the new program will perform. They are digitizing the wheel and then being able to finish the wheel by cutting or polishing.

There are certain events that it may be in the interest of the seller or builder and also the owner or purchaser of this machine that may make it advantageous to have a series of codes, that will either lock, or keep unlocked and functioning, the machines program and many of its abilities. The program itself is wheel specific and will simplify an otherwise complicated procedure which would require a higher level of training. It will also eliminate many of the mistakes that can be made when doing wheels on an of the shelf program.

Digitizing a wheel is mapping the shape of the top portion or face of a wheel. The probing or digitizing method of measurement should be accurate within approximately 0.001" (0.03 mm). However there is built into the program a smoothing action that will average out readings taken to allow a smoother more even looking cut.

There are various methods this can be done and with various probes or digitizers.

An uncommon method will be to digitize the wheel on a stand with a wheel locator (Wheel Cones) whilst using a digitizing arm. the shape of the face of the wheel is followed while taking readings.

The probe, with the ability of the machines movements within its axis, will move up to the wheel, touch and let computer read where did so on the xz grid. Then it will move back a small amount, move sideways a small set amount, go forward again and take another reading. And so on till end of wheel. This is then stored as a file on the computer 8 and will be available as a map of the face of the wheel rim 11 for future use.

The reason for cutting the face of the wheel is many new wheels have a machined face from the factory and this often gets damaged during normal use. The idea is to be able to re create this same finish so that original look can be restored. If a wheel rim 11 has been previously digitized or probed, then that file can be opened. The cutting of the wheel face is done by following that same pattern of that same wheel that was originally digitized. In following this pattern, one now has the ability to place a tool in the area on the axis grid that will be able to trim or polish the surface of the wheel.

In doing this, with a very light trim, all blemishes can be removed and thus the wheel can have a new appearance. There are other tool types that can be used like polishing wheels.

When the start button is pushed, a user will be prompted to save wheel details in data base. The data base will give a user various fields for data entry and this will be the operators choice on what to complete. A picture of wheel can now be taken with on board camera. A User will now be prompted to goto start position of wheel, which is the position where a user would want to start cutting the wheel. A user will press the ok button which lets computer know to take that positional reading and save it and then automatically will move the probe away from wheel to a safe position. The computer will now prompt a user to goto the end position, which is where a user would want the last point of contact for cutting to be. Once at that position a user now hit the ok button which again lets the computer take that positional reading and saves it. The machine will now automatically retract (Z+) the probe to a safe position.

Then would go toward the start point that was originally saved. As probe touches the start point previously recorded, it stops. Machine now retracts (Z+) probe by an amount that can be changed numerically via the keyboard normally about 0.020".

Now machine would move over (X−) also by a pre set amount and after moving over would again move forward toward wheel and when touches would stop and again take a reading. I would then move out and slowly work its way across wheel towards the position originally recorded as the end.

When probe gets to the end position, it will then move back on the (Z+) until its clear and safe. The probe cycle is now complete.

In saying this there is also a "retract" button on the monitor screens that will give a user the option of allowing the computer to safely retract the tool or probe.

The "PAUSE" button has a purpose and that is when button pressed, it will pause the probe in the away from wheel position. This is so that the wheel can be turned to another position, while the probe is not touching it. The reason for this is that the probe has to follow a straight line from beginning to end of the probe cycle and on some wheels the spokes are curved and wheel has to be turned.

The "FINE, MEDIUM and COARSE" buttons do in fact what they say. The probing can be done in fine, medium or coarse. In the event that there is a lot of detail on a section of a wheel, a user may need to probe on fine. Fine probing is more precise but takes more time, so normally only smaller areas of this are done where needed. The differentiating factor between the three buttons is in fact the distance between probe hits on the surface of the wheel. The distance can be changed numerically on screen with keyboard. One can swap between the buttons whilst in a cycle. In an area of wheel rim 11 that needs fine, this can be done. In an area that can do with coarse or medium, the operator can hit the button and it will automatically change the distance between the probe hits on the surface of the wheel.

The program has built in capabilities that will allow various procedures to take place. Some of these will be cloaked(hidden) and some will be initiated by the operator of machine. Smoothing action is a method of taking all the points that were probed and creating an average pattern within them. The problem with that is in a in areas of probing that have tight turns and radiuses, the smoothing will occur there too. This would make the smoothing action detrimental in that specific case. However what I've done here is that a user can be area specific on where a user want the smoothing to occur.

Last cut memory is a method of going a little deeper in a specific area on a wheel that has already been digitized. It is undesirable to weld on the face of a wheel as it discolors the surface and does not look good on a finished product. Should there be a gouge on the surface that is in an area that is thick enough to cut a slightly deeper area, this can now be done and still cut original depth in areas that cannot go deeper.

Using the "Cut In" "Cut Out" "Cut More" "Cut Less" and whilst the wheel is turning and performing a cut, a user will press these buttons, one at a time, which will move the tool in direction requested, by a user pre entered amount, one click at a time. This will then allow a user to take more or less of certain areas of the wheel.

However doing this may or may not leave fine lines as buttons are pressed. At the end of the cut a user will be prompted with an option if a user want to use same pattern a user just created again. If so smoothing will be done thereon and another cut can be made, but with no lines. There is another way of manually doing this, however won't be as accurate. Whilst a wheel is being cut, a user can manually move the machine by hand with the hand wheels and create the same result. However should a user need to go a bit deeper in another cut, there will be no memory to do this.

Data base is extremely user friendly with as much detail as a user want. As much info on that specific wheel that was saved can be entered when, or after it was digitized. Including a photograph by on board camera.

Next cut adjustments are made after each cut by pressing the relevant buttons in direction desired. This will move the position of tool for next cut as instructed. No numerical positional values have to be entered as would be on a regular production CNC lathe.

Firstly, the file for that particular wheel is loaded. Then check that the data and or picture is the same. Press the "START" button and the computer will prompt a user to set tool to the start position and press OK. Once OK is pressed, the machine will now record that position as the same as when the start position of the probing of that wheel was recorded.

The "DRY RUN" button can be used to see if the file loaded is firstly correct and also to fine tune the positional settings of start location. During a dry run the spindle will not turn so position can be closely monitored. The direction and speed of travel can be controlled with a the likes of an electronic hand wheel eg. the finger wheel on a computer mouse.

To move that start position, the "cut more/less and in and out buttons arrow style buttons can be used. what it in fact does is loosens up the start position and the resets all values as to how much the operator has shifted such start. This will then allow the operator to cut more or less in certain areas of wheel. These values are normally set after each full pass so one can see where more needs to be cut.

Normally when working on this machined finished face, if there is a gouge on the working area, a problem is created. If the scrape is welded, the weld would normally be seen once the wheel is cut, as it is almost always different in color. If the gouge is in an area that the wheel is thick enough to cut off a little extra, then welding may not be necessary. However the problem that would normally occur is that if a user cut deeper in one part of the wheel, then all other areas will need to be cut to same depth. The computer will now allow a user to use the "in out and more and less buttons" whilst doing a pass. In other words, one can start off doing a normal pass and then while blade is getting toward area of concern, the deeper button can be clicked, one at a time, which will in turn take the blade in the direction requested at the pre entered value for that block. Once finished with that pass a user will be prompted: "does user want to follow the original file path or the new one a user created". Now if a user follow new path the machine will follow said path but with new values as and when a user entered them on previous run.

Another method of doing the same action to eliminate the need for many undesirable welds, will be to graphic part of the program here the map of wheel can be seen on either the cutting or probing screen and pull and drag the line according to where a user would like them to be.

Yet another method will be to combine the manual part of the machine with the CNC part during a CNC cutting cycle. As there are levels within the stack of platforms and axis, there is normally one level on the x and on the z that are controlled only by manual movements. In saying this whilst a run on the cnc is in progress, very gently one can move the manual platform method of traverse in the desired direction. This would create a blending effect whilst cutting deeper in desired areas. This could obviously be done as well between runs but then the desired blending will not occur. While the CNC part of machine is working using the combined x and z axis movements to follow shape of wheel, the operator will have the ability to move all the whole CNC part of machine in and out on the z axis. This will allow one to do a light cut in areas of the wheel where this is desired and also a medium to heavy cut in other parts. This will enable deeper gouges to be cut out of wheels where this is necessary and in turn not taking excessive amount of metal off of the wheel.

This method of cutting a wheel is far superior than regular off the shelf programs as in a regular CNC program the operator has to continually enter values after every completed movement during the wheel cutting cycle. Should a value be mistyped or incorrectly calculated by operator, the machine could be mistakenly set up in a way that will probably damage the wheel and possibly the machine and operator.

The lathe will have the ability to be able to be used in either the manual mode, or the CNC mode. This would be beneficial to wheel companies as often two lathes are needed to serve this purpose and in this case, one will be sufficient.

The movement described below is that of the apron itself, on top of which is the tool post. It is not in fact the rotation of the spindle.

Whereas some cnc (computer controlled) machines do have the ability to control movement manually with either a dial or jog button, this movement is created by the operator turning a dial, which in turn will supply power to electrical motors that will create movement of tool post.

The problem in using computer or electrically controlled movement for this purpose of manual motion, is that the operator has no personal feel of resistance to the movement of the tool post and a deeper than desired cut can easily be made.

In other words should an operator turn dial slightly too much, this movement is created and executed immediately with no forgiving.

On standard manual lathes that are not computer controlled, this movement is created by an operator turning a handle which will in turn create movement of tool post. Resistance is felt by operator thus reducing the risk of an error. Resistance is the key With this in mind the "automotive wheel combo lathe" will have the ability to be used as a conventional manual machine, as the applicable motors can be turned off and a manual operator controlled method of movement can be used.

When the "MANUAL" button mode is used, the servo motors will move the tool post to a desirable position for manual work and then they would switch off which would allow manual movement of ball screws. This would allow the operator of machine to then manually control the position of tool post, while still being able to turn on the spindle which will in turn spin the wheel.

In doing this, the complete method of a manually controlled machine that has no cnc or servo motor assists is created. Furthermore, at the touch of a button the machine can go back to a cnc machine with the full ability of computer controlled movement. Also due to the fact that this machine has stacked levels of axis as described in beginning of document, there will be certain levels that will only be controlled by manual movement.

The manual mode is for wheels that have suffered some physical damage. It would allow the operator to manually control certain settings on the lathe. These settings would include speed of turret and positioning of the tool post within the x and z axis by a manual movement of a hand wheel without the use of positional electrical motors. An example where this would be used would be on a wheel that needs to be skimmed. This would be necessary when the wheel plate that makes contact with the hub of the motor vehicle may have a burr that needs to be corrected. Also when a wheel is chrome plated this often happens as the chrome may be thicker, or have left some burrs that may cause run out when the wheel spins. There are many instances that will require a manual lathe to correct damage on a wheel In this case the operator can control the machine in the manual mode (as he would any manual machine). There are other times that a wheelwright (repairer of wheels) would require a manual lathe for the repair, or partial repair of a wheel. This could all be done in the "manual mode".

The lathe will have the ability to be able to be used in either the manual mode, or the CNC mode. This would be beneficial to wheel companies as often two lathes are needed to serve this purpose and in this case, one will be sufficient.

The movement described below is that of the apron itself, on top of which is the tool post. It is not in fact the rotation of the spindle.

Whereas some cnc (computer controlled) machines do have the ability to control movement manually with either a dial or jog button, this movement is created by the operator turning a dial, which in turn will supply power to electrical motors that will create movement of tool post. The problem in using computer or electrically controlled movement for this purpose of manual motion, is that the operator has no personal feel of resistance to the movement of the tool post and a deeper than desired cut can easily be made.

In other words should an operator turn dial slightly too much, this movement is created and executed immediately with no forgiving.

On standard manual lathes that are not computer controlled, this movement is created by an operator turning a handle which will in turn create movement of tool post. Resistance is felt by operator thus reducing the risk of an error. With this in mind the "automotive wheel cnc lathe" will have the ability to be used as a conventional manual machine, as the applicable motors can be turned off and an operator method of movement can be used.

The program is windows compatible and thus can carry out its own functions, but also be able to allow windows operating system to work in conjunction with it. External monitoring of files and system, including video and photography can be achieved.

Downloading and uploading will be allowed by known parties.

With this in mind the above will create various settings wherein many positive features can be created. Some are: Photos of wheels in data base; remote training on machine; video conferencing with included camera; external diagnosing and correction of break downs; and Downloading of Upgrades.

The program will be able to carry out certain functions normally not included in cnc lathe abilities. It will have the ability to create a start and end position of motion for each wheel that is digitized. Before, after and within that movement it will have the ability to perform certain functions. There will be a lead in and out that is preset and can be changed by operator. This is so as to not leave a visible start or end point on the wheel.

It will have the ability to create its own smoothing action that can be can be targeted to a certain part or all of the digitized map of the wheel.

It will have the ability to manually override the program and create movements controlled by operator whilst and during a run in the cutting process of a wheel. This can be used should there be an area on face of wheel that has a possible burr or damage and there is a desire to deepen or withdraw the depth of the movement in that specific area. A memory of last cut is made and operator can either follow the last cut or the original.

Upon a wheel being digitized, it is now possible to take the points that were recorded in that file and create a smoothing action by averaging them out. When a wheel is being probed or digitized, some of the readings may be ever so slightly read in error. There are many possible causes that this may occur. For the most part there is normally still a layer of clear coated paint over wheel. Within this covering there may be slightly high spots due to foreign object such as dust that fell onto wheel while paint was curing. Should the probe have taken a reading at the point where the dust had caused a high point, this reading would appear in the new probed file to be saved. There are many other factors that could cause this problem. Another possibility is when there is a wheel that needs to be turned during a probing cycle, there may a height difference from one spoke to another. The reason that some wheels need to be turned is that there is no straight line from the probing start point to the end. The desired area of digitizing is the face of the wheel (high areas) and not going into lug holes and low areas of wheel. Remembering that we are only skimming the face of the wheel.

There is no straight path from start to end of digitizing or probing path. In this event the wheel would be turned once pause is activated during the probe cycle, so as to allow the continuation of the straight line for probe to follow.

On some wheels there is a steep incline at the beginning of the cut, as there is also at the end of the cut. This creates a problem as most cutting tools need to be set at an angle to facilitate the direction and positioning of the movement. In other words the angle of tool may allow the first part of wheel to be cut, but cannot move over the last incline on wheel on the path at end of cut. In the past it has been necessary to initiate two separate procedures or cuts to complete wheel.

Also, in the past, the area of contact of the wheel and cutting tool constantly varies during a move as the shape or pattern of the wheel would constantly be varying. This may lead to problems both in the quality and appearance of the end product. The new machine has a method around this issue. It is in fact a revolving turret or tool post. The angle that is set at the beginning of a procedure will automatically with the aid of the computer to keep an optimal cutting angle at all times.

There is also the possibility of polishing wheels with a buffer or pad. Instead of using a tool with blade, a motorized polishing buff can be mounted in its place. In this event the wheel would still be digitized so as to allow machine to follow that pattern and then polishing could be attained though the cnc machine. What in fact would be happening is while the pattern of the wheel is being followed, a buffing wheel will be spinning and just touching on the surface of the wheel. While this is happening the machine will be turning the wheel, either at a preset high or low speed.

The computer will also allow the tool post (where upon the buffing wheel will be set) to move backward on the "Z"

axis to touch on a block of polishing compound, or to be oiled with polishing oil via the serpentine oiler.

While the machine is following the pattern of the wheel as it would be while cutting a wheel. instead of mounting a cutting tool in the tool post, a polishing buff will be mounted instead. This will allow a polished finish to be attained but only on the first flat surface of the wheel. This is finish on many oem wheels and up to now cold not be easily duplicated in a used wheel refinishing plant.

Up to now most chuck jaw 51s that were made for wheels have steps in them that will wrap around the lip of wheel so as to fasten the wheel to machine. At times when using a manual (not cnc) lathe, the wheel is mounted with the face facing the chuck so as to be able to get to work on the back or inside of the wheel. This is not always possible as many wheels have a face that is convex and some also have spokes and other hindrances that get in the way of fastening the wheel in a suitable position that will allow the wheel to spin central to the chuck of machine. (See FIG. 16 below). The new machine can offset the depth that wheel fits into the jaw 51 with the aid of a set screw that can be adjusted to suite wheel.

The new method off attaching a wheel within jaw 51 that can compensate for the above will be as follows. There will be placed within the jaw 51, at the contact area where face of wheel will be situated, a set screw that can offset the depth that wheel fits into the jaw 51 51 and thus the angle of the wheel can now be adjusted.

Motion can also be created with the use of hydraulics. This can facilitate with polishing to keep buffer steady. The positive aspects of using hydraulics at times over motors is that it can take more abuse and certain applications do abuse machine more that others. An example of this is polishing. There is most certainly a lot of stress and not to mention dirt that can affect the machine adversely. Should the application of the machine be aimed more at polishing as a n example, then it may make sense to use either all or partly hydraulic means to attain the best level of workmanship.

Much the same as the above polishing, but instead of a buff wheel, a drill will be placed in the tool post. This will allow holes to be drilled at specific pre determined positions in the wheel. An example of this is a BMW wheel will have a different PCD (pitch circle diameter) to that of a Mercedes. The PCD is in fact the bolt holes in wheel to which a bolt is placed through that will attach the wheel to the car.

With this machine, as it has the capabilities of determining positions it will have the possibility of drilling holes at these positions With a wheel in place on machine and determined central, it would be possible to attach a drilling or milling method to tool post which will facilitate the drilling out of bolt holes at given distances from center of wheel. This would be in place of either the cutting blade or the polishing motor.

The CNC part of the lathe will be able to determine at what distance a drill is from the center. Thus if it is at 50 mm from center, the PCD it would be drilling would be 100 mm as we are working on circle diameter. Now there is in place an encoder on the spindle motor (chuck) of the lathe. This normally serves as a means of controlling the rotation and speed of the wheel. It is however very accurate in determining where its position is within a single revolution. The computer control can thus split a revolution into as many quadrants as there are lug holes in a wheel. Holes are drilled in wheel 11 at a position determined by the distance the "X" axis is from the center of wheel 11. The method of actual drilling would be the "Z" axis moving inward with drill and thus boring of hole will occur.

The same cycle will continue but with the wheel being rotated to the next quadrant at which another hole will be drilled.

The above method can either be carried out manually by using the DRO (Digital Read out) or by using the control of the computer.

There are many instances where this machine will improve quality of workmanship, time management and make it a more affordable investment on a whole than it has been in the past with similar machines.

There are a few reasons that one may need to use this machine to complete a wheel repair or refinish. In either event the following steps will be followed:

Mount wheel 11 in jaw 51 of chuck; if wheel 11 is not running central in chuck, then adjust at least one of set screws 73 for positioning of wheel; If wheel is to be cut manually then press manual operation button on display and proceed to cut in manual mode; If wheel has a saved digitized file then proceed to cut wheel in CNC mode; If wheel is to be digitized or probed then press digitize wheel and follow the on screen prompts; after wheel is digitized, load the applicable digitized file for cutting wheel; start wheel cut process in CNC by performing a dry run, while watching following distance of tool to see if all in order before the final cut; after all settings are concluded and ready for cut press start; after this run when wheel stops, visually look at wheel to see where adjustments are necessary, for next cut. Complete this step as necessary until wheel is completed.

The jaw 51 that can adjust the wheel to better centralized position in chuck. The program and its method in making work to be carried out simpler with less chance of mistakes.

A safer method of doing wheels for both the user of machine, the wheel and the machine itself. This is attained by the physical enclosure around wheel and the workings of actual machine and program. The small foot print with large wheel capabilities.

It is exceptionally hard to get a production lathe that is small and has a large swing. More so with wheels as the sizes have increased considerably over the past decade. As the machine has a small foot print the space rental for the work area is reduced to that of a large machine. Also many existing shops have lathes today that cannot work on the larger wheels.

For the most part there has been no real reason to incorporate the manual and CNC lathe into a single unit. With wheels there is a need for both machines and due to floor area rental and also cost of machine, it makes sense to incorporate both manual and the cnc method.

In the novel machine 10 there is no disconnect between motors to create its manual movement. Also a CNC program can be run at same time as, and in conjunction with the manual part of the machine.

The below description is of a significant reason that CNC and totally manual machines are not combined. Manual is referring to is manual "without servo motor assistance". The reason that the user does not want the manual without motor assistance (i.e. electrical movement) is that we need to be able to feel pressure exerted whilst we are cutting a wheel. If one cannot have this feel, far deeper cuts and mistakes will be made while moving an electrical hand wheel manually that has no feel at all.

On a normal CNC machine, on a regular basis (probably every time machine is switched on) a homing action is needed. This is for the control of machine to know its own location within its axis. Homing occurs when each of the applicable axis movements touch up against a pre determined limit switch and inadvertently creates a home position that the machine will work from. This will aid in tool setting distances and create a uniform and constant environment from which the machine will operate. Now most CNC machines have a manual ability which is essentially just an override of control of machine. This movement is often created by electrical hand wheels. As described in paragraph above, this is not the manual ability that we are seeking as there is no feel for what we are doing. What is wanted is total manual movement created by a source other than the electrical control of machine. We need to manually turn balls crews or gear racks to create this movement. Unfortunately once this is done on a conventional CNC, positions are lost.

In the case of the novel combined manual/CNC machine, homing is not necessary as it is easier to setup the angle of the tool at the start position of the wheel to be cut, and then setting this in the machine control as the start position by pressing a button on the computer screen. This will be set on every wheel as on average, every wheel will be different.

On a normal CNC, if it were to have the manual ability, its own homing position will be lost every time one moves the manual position of the machine. This would create a lot of extra work between every job. It would not be desirable on a day to day CNC machine to have manual capabilities, that are not controlled by the control itself.

On the novel machine, there is no problems with moving the manual position of the machine as there is no homing and setting position of each wheel is done anyway and is a very easy process.

Another advantage in the way that the novel CNC/manual machine is set up is that the CNC and the manual ability of the machine can be operated simultaneously. This is handy when there would be a deep scratch in the wheel and while the CNC program to cut the wheel is running, and with wheel spinning, a slight adjustment in the manual z table can be performed whilst the blade or tool is passing over the scratched area. This would allow minimal metal removal from the wheel as a deeper cut is only performed in the area where it is needed.

When renting space to open shop, a key factor is power into building. This is a limitation in many cases if there is no 3 phase power. It is costly and inconvenient to work around. This machine can be used on single phase power if necessary and also the electrical consumption is kept to a minimum as all motors etc are geared for the job at hand.

With a conventional lathe production machine, it is always an overkill as at time of manufacture there is no way of them knowing exactly the use of the end user.

It is also an option that part of the machine can be separated at FIG. 1. 81 upwards and sold in a kit form. This could be attached to almost any lathe. The kit would come complete with FIG. 1. 81 and above and will include a separate box with computer and control.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A machine for refinishing of repairing of damaged wheel rims comprising: selective operability as a manual lathe, CNC lathe, or combinations thereof; a rotational wheel rim holding spindle; a jaw for holding a wheel rim, said jaw having plurality of angular surface features that further secure said wheel rim said jaw plurality of angular surface configured with an adjustable decreasing diameter, and configured to pull, hold, and lock a wheel rim into either a wedge shape region or a back angle region of jaw; set screws imbedded in said jaw, wherein said set screws extend outward from an interior channel formed in said jaw and are utilized to level a wheel rim held in said jaw, said jaw and spindle configured in an arrangement imparting stability and engagement of wheel while under load of machining, acceleration, deceleration and high speeds; at least two platforms for supporting a tool post, said tool post is rotational about an axis while said spindle is moving and said tool post is moving, wherein said tool post holds a cutting tool in a configuration changeably selectable from a first angle of cutting to a second angle of cutting whilst uninterruptably performing a lathing operation; wherein said tool post is movable along at least 2 of an x-axis, a y-axis, and a z-axis.

2. The machine of claim 1 wherein said spindle is rotatable by moving a wheel rim secured thereto.

3. The machine of claim 1 wherein said tool post is moved manually, by a computer controlled program, or combinations thereof.

4. The machine of claim 1 further comprising of a large swing about the spindle relative to size of a machine frame.

5. The machine of claim 1 wherein said selective operability is performed while said wheel rim remains in said spindle.

* * * * *